United States Patent
Kawaguchi et al.

(10) Patent No.: US 6,978,035 B2
(45) Date of Patent: Dec. 20, 2005

(54) INFORMATION HIDING SYSTEM, METHOD, AND PRINTED MATTER INTO WHICH INFORMATION IS HIDDEN

(75) Inventors: Eiji Kawaguchi, Fukuoka (JP); Richard Eason, Orono, ME (US); Kunihiro Tsuda, Nakabaru-Shin-machi (JP)

(73) Assignee: ASA Systems, Inc., Fukuoka (JP)

( * ) Notice: Subject to any disclaimer, the term of this patent is extended or adjusted under 35 U.S.C. 154(b) by 806 days.

(21) Appl. No.: 09/819,936

(22) Filed: Mar. 27, 2001

(65) Prior Publication Data

US 2002/0051162 A1 May 2, 2002

(51) Int. Cl.$^7$ .............................................. G06K 9/00
(52) U.S. Cl. .................................................... 382/100
(58) Field of Search ................... 382/100, 112, 232; 380/51; 713/176; 348/460; 725/3; 399/366; 358/3.28; 283/72, 74, 75, 113; 162/110

(56) References Cited

U.S. PATENT DOCUMENTS

| | | | | |
|---|---|---|---|---|
| 5,686,725 A * | 11/1997 | Maruyama et al. | ......... | 250/271 |
| 5,734,752 A * | 3/1998 | Knox | ......... | 358/3.28 |
| 5,901,224 A * | 5/1999 | Hecht | ......... | 713/179 |
| 6,104,812 A * | 8/2000 | Koltai et al. | ......... | 380/51 |
| 6,215,421 B1 * | 4/2001 | Kondo et al. | ......... | 341/50 |
| 6,239,818 B1 * | 5/2001 | Yoda | ......... | 347/43 |
| 6,243,480 B1 * | 6/2001 | Zhao et al. | ......... | 382/100 |
| 6,263,086 B1 * | 7/2001 | Wang | ......... | 382/100 |
| 6,556,688 B1 * | 4/2003 | Ratnakar | ......... | 382/100 |
| 6,580,804 B1 * | 6/2003 | Abe | ......... | 382/100 |
| 6,591,009 B1 * | 7/2003 | Usami et al. | ......... | 382/165 |
| 6,731,788 B1 * | 5/2004 | Agnihotri et al. | ......... | 382/157 |
| 6,771,812 B1 * | 8/2004 | Ikenoue | ......... | 382/164 |
| 6,785,814 B1 * | 8/2004 | Usami et al. | ......... | 713/176 |
| 6,886,750 B2 * | 5/2005 | Rathus et al. | ......... | 235/462.15 |
| 2003/0210804 A1 * | 11/2003 | Rhoads | ......... | 382/100 |
| 2004/0071312 A1 * | 4/2004 | Ogawa et al. | ......... | 382/100 |
| 2004/0190750 A1 * | 9/2004 | Rodriguez et al. | ......... | 382/100 |

* cited by examiner

Primary Examiner—Andrew W. Johns
Assistant Examiner—Shervin Nakhjavan
(74) Attorney, Agent, or Firm—Michael J. Persson; Lawson & Persson, P.C.

(57) ABSTRACT

An information hiding system that hides information-data in the printing-data according to steganography using an embedding means, and produces printed matter by printing out the printing-data on printable media. A scanner is used to read the data, such as image or pattern data, from the printed matter in order to restore the printing-data. The hidden information-data is then extracted from the restored printing-data using an information-data extracting means. Finally, the information-data is outputted in such a form as an image, musical or voice sound, and/or character letters according to the outputting means.

18 Claims, 6 Drawing Sheets

FIG. 6
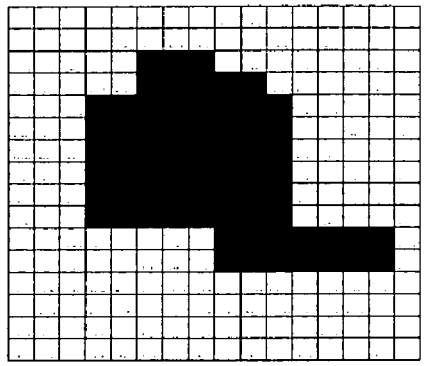
P
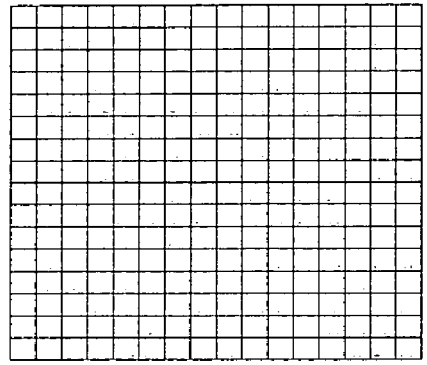
W
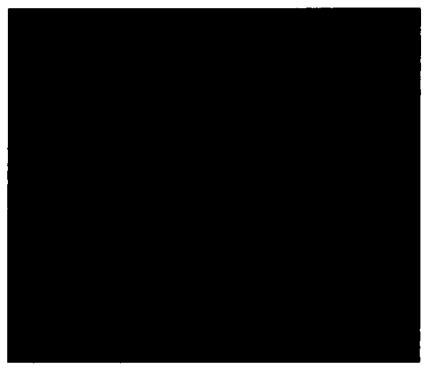
B
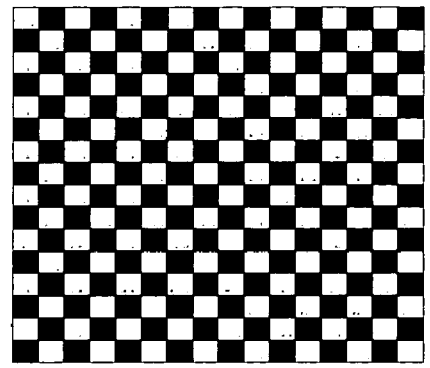
$W_C$
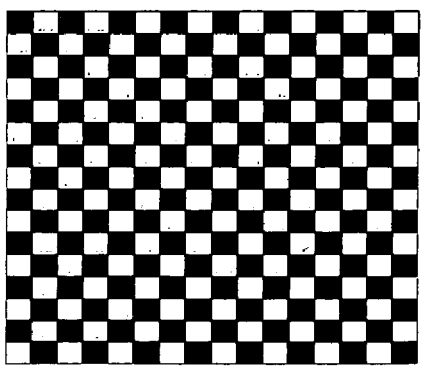
$B_C$
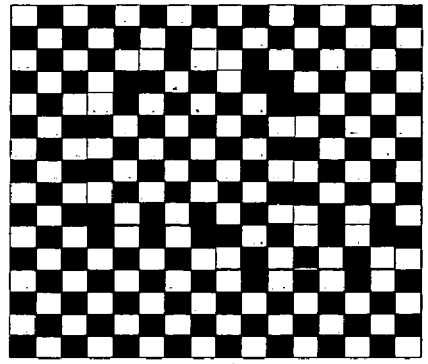
$P^*$

1

INFORMATION HIDING SYSTEM, METHOD, AND PRINTED MATTER INTO WHICH INFORMATION IS HIDDEN

This application claims the benefit under 35 USC §119, based upon a prior filing in a state that is a member of the Paris Convention, of Japanese Patent Application No. 2000-87454, filed on Mar. 27, 2000.

FIELD OF THE INVENTION

The present invention relates to an information hiding system using printed matter and, in particular, to a printed matter and information hiding system using printed matter that utilizes steganography.

BACKGROUND OF THE INVENTION

The performance of color printers and color copying machines has progressed considerably in recent years. As a result, society began suffering from forgery of printed matter using such machines. For example, currency notes, paintings, tickets, and pre-paid cards are most likely to be targeted for forgery and illegal use. Because of this risk of forgery, there is now a demand for forgery resistant and illicit-use protected printed matter, as well as systems for creating such printed matter.

One art recognized means of prevent forgery or illicit use is to password protect documents using magnetic strips, bar codes or the like. However, as society gets more and more complex, individuals are required to memorize more and more confidential data, such as passwords, for daily activities. Accordingly, the realization of a handy system, which does not use any computer or electronic device yet readily protects such confidential information, has been long awaited.

One example of such system is found in the Applicants' International Publication No. WO 00/19365, which is incorporated herein by reference. This publication discloses a card system wherein each card has a legal cardholder's photo picture printed on the card surface in such a way that confidential information is hidden in the printed picture, and only the legal card holder can restore the confidential information out of the picture. However, as is the case with all traditional image-based steganographic and watermarking techniques, which are also known as image deep layer cryptography and electronic scorch-out techniques, this system requires the use of information hiding techniques on computer data. In this case the information-hidden image data is saved in computers as a file, or transmitted through computer-networks as a file.

The drawback of this type of system is that once a printing device prints out the information-hidden image data, the confidential information cannot be subsequently extracted, as the accuracy of the printed image by a printing device is insufficient, and as the image reading device (i.e., image scanner) cannot restore the image data exactly. For this reason, both traditional steganographic techniques and watermarking strategies do not satisfy the social demands as described above and, therefore, printed image based steganography or watermarking techniques have heretofore been avoided.

Accordingly, there is a need for printed matter that is self-authenticating and for information hiding system that will produce printed matter from standard printing devices in which embedded confidential information, such as authenticating information, may be extracted.

SUMMARY OF THE INVENTION

The present invention is an information hiding system for printed matter and the printed matter that includes the hidden information. The printed matter of the present invention allows the information data to stay completely confidential because the information-data is embedded in the printing-data, such as image and pattern data, that is printed out on the printable media.

The information hiding system hides information-data in the printing-data according to steganography using an embedding means, and produces printed matter by printing out the printing-data on printable media. A scanner is then used to read the data, such as image or pattern data, from the printed matter in order to restore the printing-data. The hidden information-data is then extracted from the restored printing-data using an information-data extracting means. Finally, the information-data is output in such a form as an image, musical or voice sound, and/or character letters according to the outputting means.

The data embedding in this steganography is accomplished by representing the value of the printing-data in a Pure Binary Code (PBC) system and, in some embodiments, converting the printing-data to a Gray Code system. The printing-data is then decomposed into bit-planes, which are subsequently segmented into regions of the planes using a complexity measure. The final step in this data embedding process is to replace the complex regions with the information-data. In some embodiments, the information-data is embedded in its original form, while in others portions of it are embedded in conjugated form. The information data extracting process uses the reverse steps to those utilized in the embedding process.

As the system makes use of printed-data, it becomes possible to embed the information data, in either image, musical sound, voice sound, or character letter form, that looks just like ordinary printed matter, and to extract the data when needed. Accordingly, such a system can embed confidential information within the printed matter, and store them or transmit them elsewhere in a very safe way.

The information hiding system of the present invention creates printed matter in which the printing-data is printed by a printer onto a surface, such as a paper or card surface, for subsequent reading by a scanner.

Let x0 be the image or pattern data before printing, i.e. the original image data, and x be the same data after printing. Due to the printing-out characteristics of the printer, x is generally skewed from x0. This x is once more transformed to y, i.e. the read-out image data, when it is read-out by a scanner according to its reading-out characteristics. This y differs in some respects from the original x0.

The original image data x0 along with the read-out data y denote the respective pixel values of the image, which are the binary pixel values of each color component for a color image, and the binary intensity values of each pixel for a mono-chrome image. In either case, each value consists of several bits.

The following is a more detailed explanation of the color components of the image and patterns, or the pixel intensity in the case of monochrome images.

Regardless of the difference in the binary code systems, we denote the binary value at each pixel as, $$p1, p2, \ldots, pN.$$

Where p's proceed from the least significant bit to the most significant bit. Under this circumstance, if some data-compensation method parameterized with as small numbers as possible, referred to as compensation parameters, can adjust the read-out data y into image data, denoted by y0, that is close to the original data x0, then a printed image based steganography can be implemented according to the bit-plane complexity segmentation (hereafter BPCS) steganographic method, or other steganographic method.

More specifically, if such a method can compensate all the k-th and upper bits of each pixel in the read-out data y to become exactly the same as the original data x0, then the BPCS-Steganography using k-th to N-th bit planes will work successfully. The value k should be determined experimentally.

Such a compensation parameter as described above is only valid for a specific combination of printer, scanner, and printing-data. Therefore, it is impossible, without using the valid compensation parameter, to extract and steal the confidential information-data by reading-out the image data y, and recover the original image data x0, which is actually getting the data y0 that is as close to x0 as possible. Accordingly, the valid compensation parameter can be used as the decoding key in the steganography that uses printed matter. It is also used for a customized key in the BPCS-Steganography.

The BPCS steganographic method replaces, or embeds, a random pattern of image data with other information data, sometimes denoted as confidential or authentication data, according to the complexity or randomness of a binary pattern on a "bit-plane" that is obtained, e.g., by slicing the image data into bits. Whereas the data hiding capacity of conventional steganographic techniques ranges from 5 to 10%, the data hiding capacity in BPCS-Steganography amounts to 50% or more, in some cases it ranges up to 70%. Therefore, the BPCS-Steganography is capable of hiding a very large amount of data.

The preferred embodiment of the system utilizes BPCS-Steganography, or the related PDCS-Steganography, which are both described in the Inventors' co-pending U.S. patent application Ser. No. 09/316,883 filed on May 21, 1999 incorporated herein by reference, due to their large data hiding capacity. This large hiding capacity is preferred for a number of reasons. For example, if a third party has not become aware that some confidential data is embedded, it is impossible to see any difference between a confidential data-embedded image and a non-embedded image. Further, even if someone suspects that confidential data might be embedded, they are unable to know, without a customized key, where and how the confidential data can be extracted.

The BPCS-Steganography is based on the following four basic ideas:

(1) Bit-plane decomposition is executed on a Pure Binary Coded (PBC) image data or a "Canonical Gray Coded (CGC)" image converted from the PBC data.

(2) Bit planes are segmented according to the "complexity measure" of a binary pattern, and a complex pattern is replaced by the confidential data. The confidential data thus hidden is completely unnoticeable for human eyes.

(3) Files to be embedded are subject to a "conjugation operation," so that any type of files can be embedded.

(4) The algorithm of BPCS-Steganography, including encoder and decoder programs, can be customized differently for different users. The customized BPCS-Steganographic algorithm establishes the security of embedded information with the use of a "customized key" that is different from a password.

Therefore, it is an aspect of the present invention to prevent forging of printed matter and to protect against illegal use of such printed matter.

Still other aspect of the present invention is to implement the embedding of confidential information, such as images, musical sounds, voice sounds, as well as character letters, in printed matter, and make it possible to save it in an unperceived manner or transmit it in an unnoticed way.

These aspects of the invention are not meant to be exclusive and other features, aspects, and advantages of the present invention will be readily apparent to those of ordinary skill in the art when read in conjunction with the following description, appended claims and accompanying drawings.

BRIEF DESCRIPTION OF THE DRAWINGS

FIG. 6 is a diagram illustrating the steganography of the preferred embodiment of the information hiding system using printed matter.

DETAILED DESCRIPTION OF THE INVENTION

An information hiding system using printed matter according to one embodiment of the present invention will now be described with reference to FIGS. 1–6.

Figure 1:
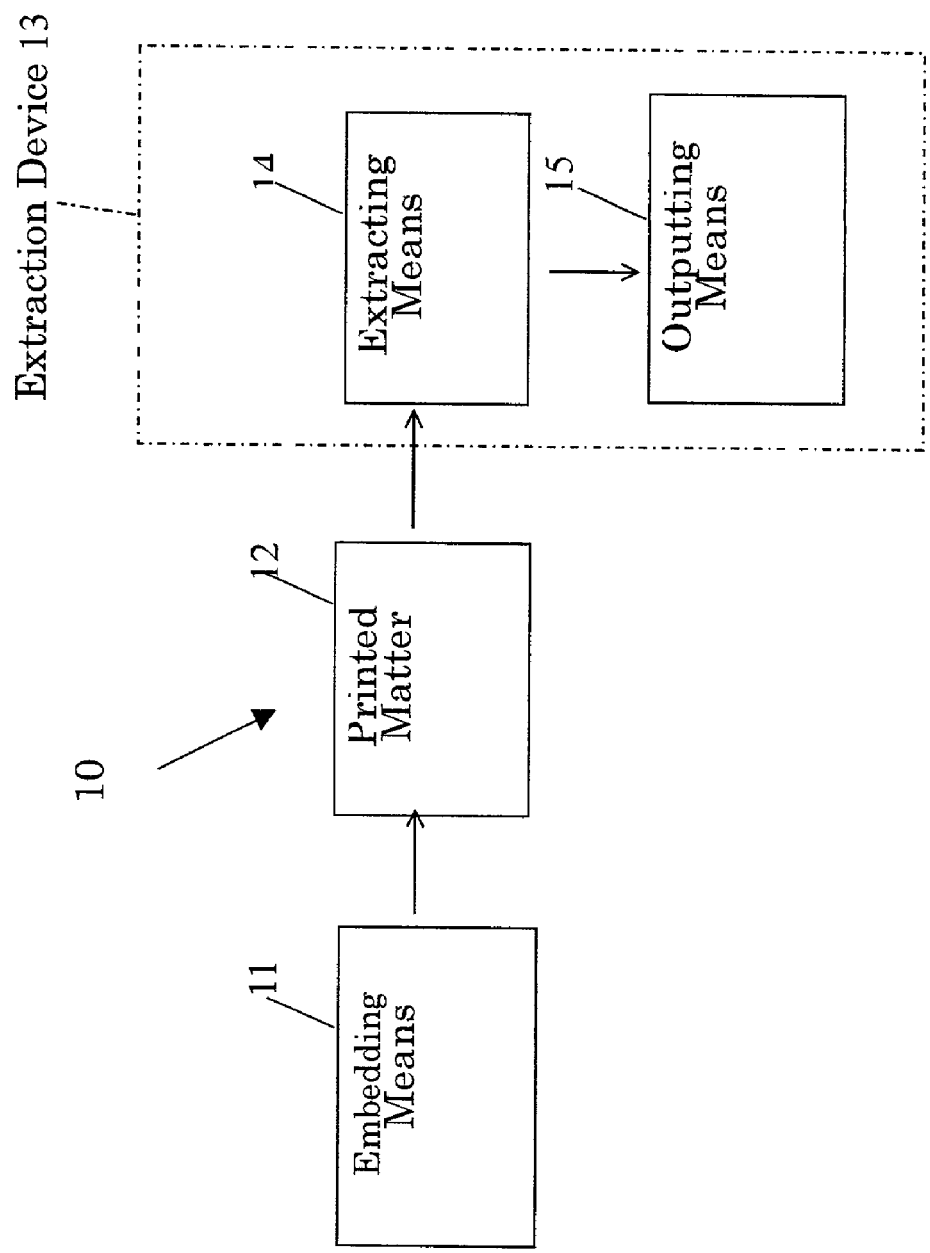
FIG. 1 is a block diagram illustrating the function of the information hiding system using printed matter.

FIG. 1 is a block diagram, showing the concept of the information hiding system of the present invention. As is shown in the FIG. 1, the embedding means 11 of the information hiding system 10 using printed matter is used to embed information-data into the printing-data. This information-data is sometimes referred to as confidential data or authentication data, and may be in the form of an image, text, musical and voice sound, or other art recognized data structure. The system 10 then produces the printed matter 12 by printing out the data-hidden printing-data on printable media, such as paper, card stock or the like. When the information data is to be retrieved, the system processes the printed matter with a data-extracting device 13, which includes an extracting means 14 and an outputting means 15. The extracting means 14 is used to restore the printing-data, embedded with confidential data, from the printed matter 12, and then extract the embedded information-data from the printing-data. The extracted information-data is outputted by the outputting means 15 for verification. In some embodiments, such as those in which the information data is either image or character data, the outputting means 15 causes the information data to be displayed on a monitor or printed out by a printer. In embodiments where the information data is musical or voice sound, it will be output as an acoustic sound from a speaker.

Figure 2:
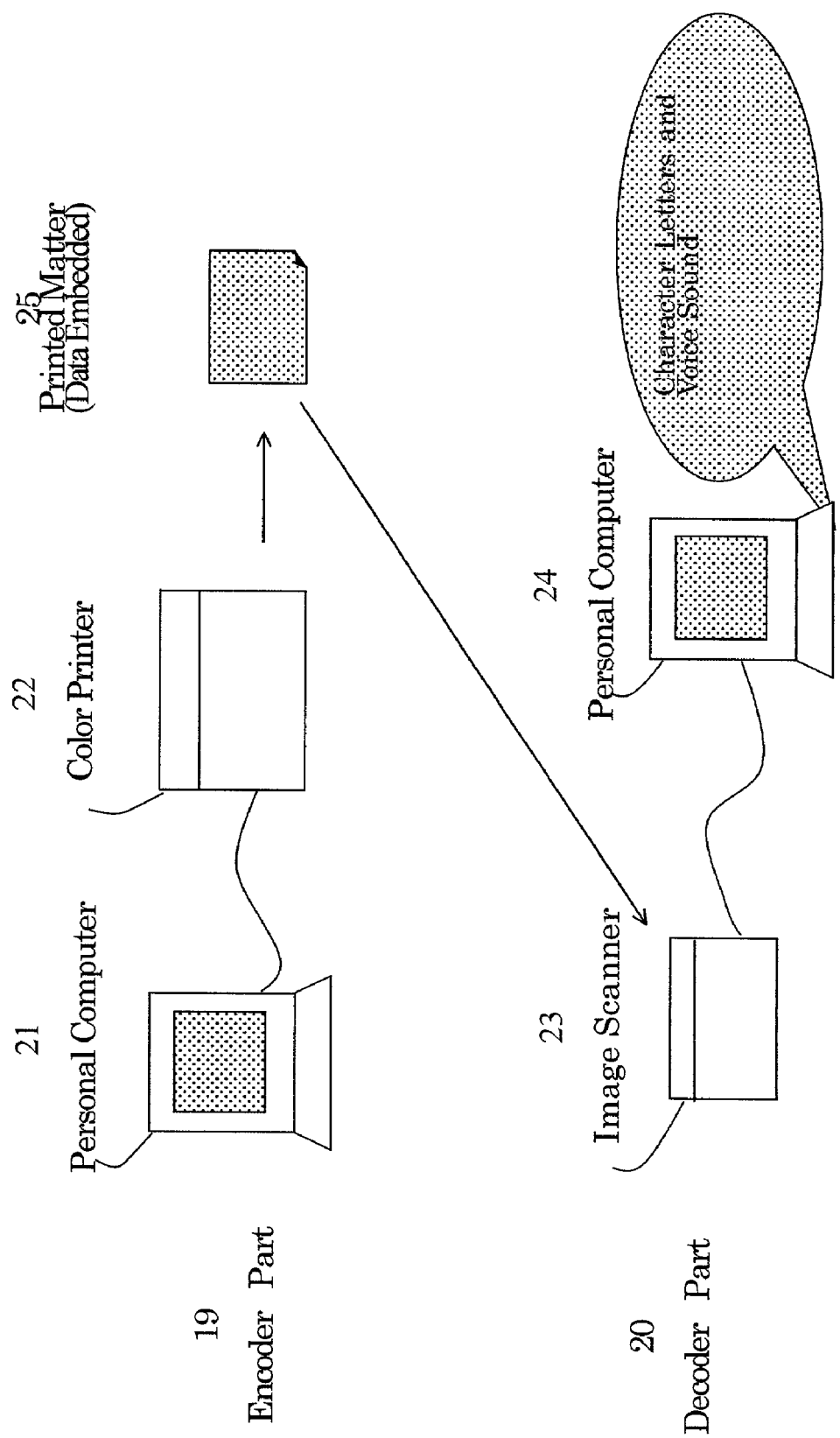
FIG. 2 is a diagram showing an overview of one embodiment of the information hiding system using printed matter.

FIG. 2 illustrates the preferred information hiding system 10. The preferred system 10 includes the encoder 19 and decoder 20, which serve as the embedding means 11 and extraction device 13 respectively. The encoder 19 preferably includes an encoding personal computer 21 into which an encoding algorithm is stored. The encoding personal computer 21 serves as the embedding means 11, and its input/output devices such as mouse, keyboard, and monitor, not shown in this figure. A color printer 22 is preferably in electrical communication with the computer 21 and prints out the printing-data being embedded with information data upon the printable media (not shown) to produce the printed matter 25.

The decoder 20 preferably includes an image scanner 23, which reads the printed matter 25 and converts the printed matter 25 into computer readable form, and a decoding personal computer 24, into which a decoding algorithm is stored. In the preferred embodiment the decoding personal computer 21 serves as both the extracting means 14, by restoring the printing-data with confidential data to extract the hidden data, and outputting the data to an output device, such as a printer (not shown), or to a peripheral, such as an, external memory device, monitor, etc.

Figure 3:
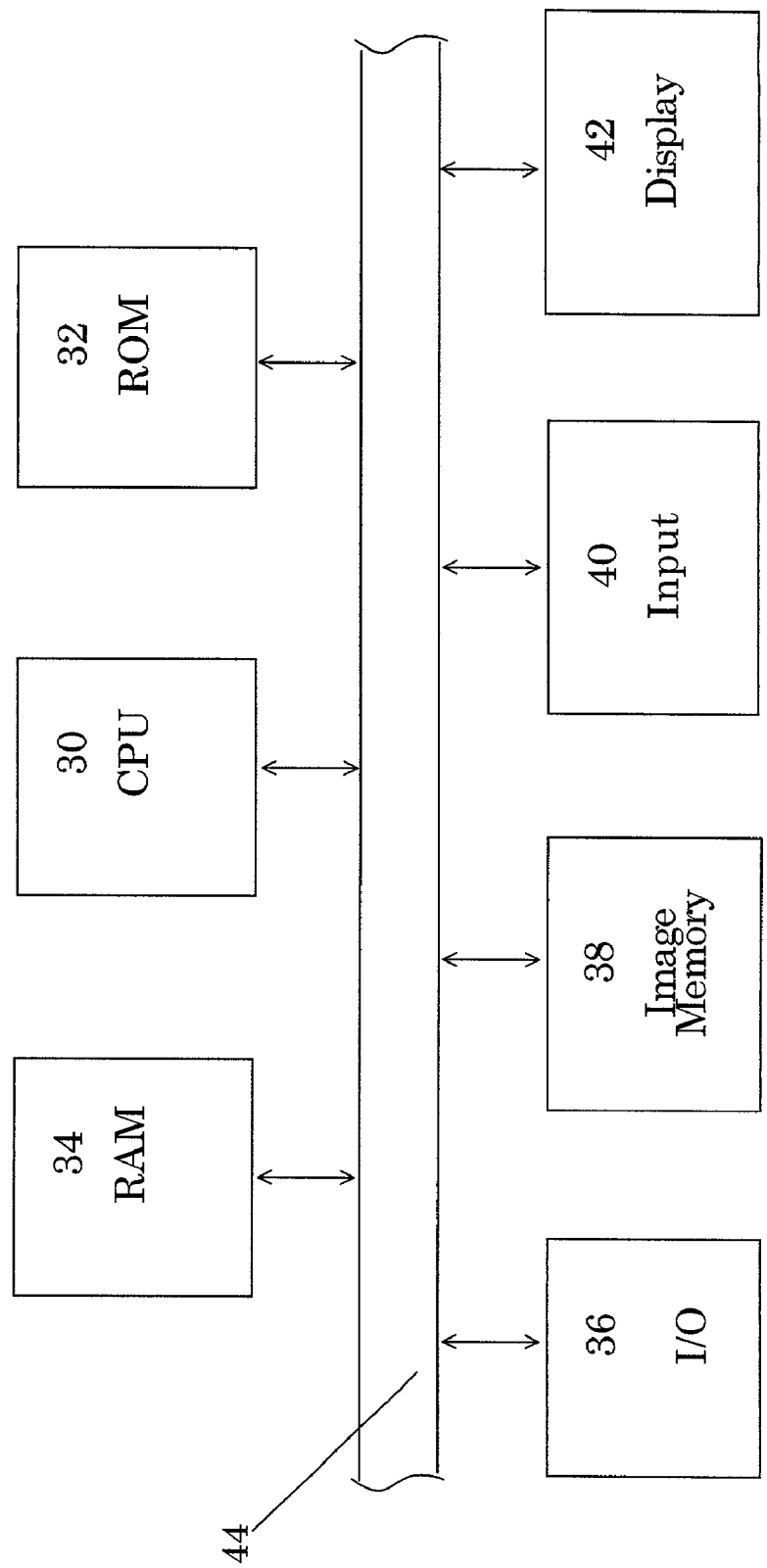
FIG. 3 is a block diagram showing another embodiment of the information hiding system using printed matter.

FIG. 3 shows the basic components of the personal computers 21 and 24. The computers 21, 24 that provide the embedding means 11, extracting means 14, and outputting means 15 preferably include a central processing unit 30 (CPU), read only memory 32 (ROM), random access memory 34 (RAM), Input/Output (I/O) Interfaces 36, as well as Image Memory 38 (VRAM) that are all linked together by a bus line 44. The input devices 40 such as mouse and keyboard, and output devices 42 such as a display unit are also linked to the bus line.

Figure 4:
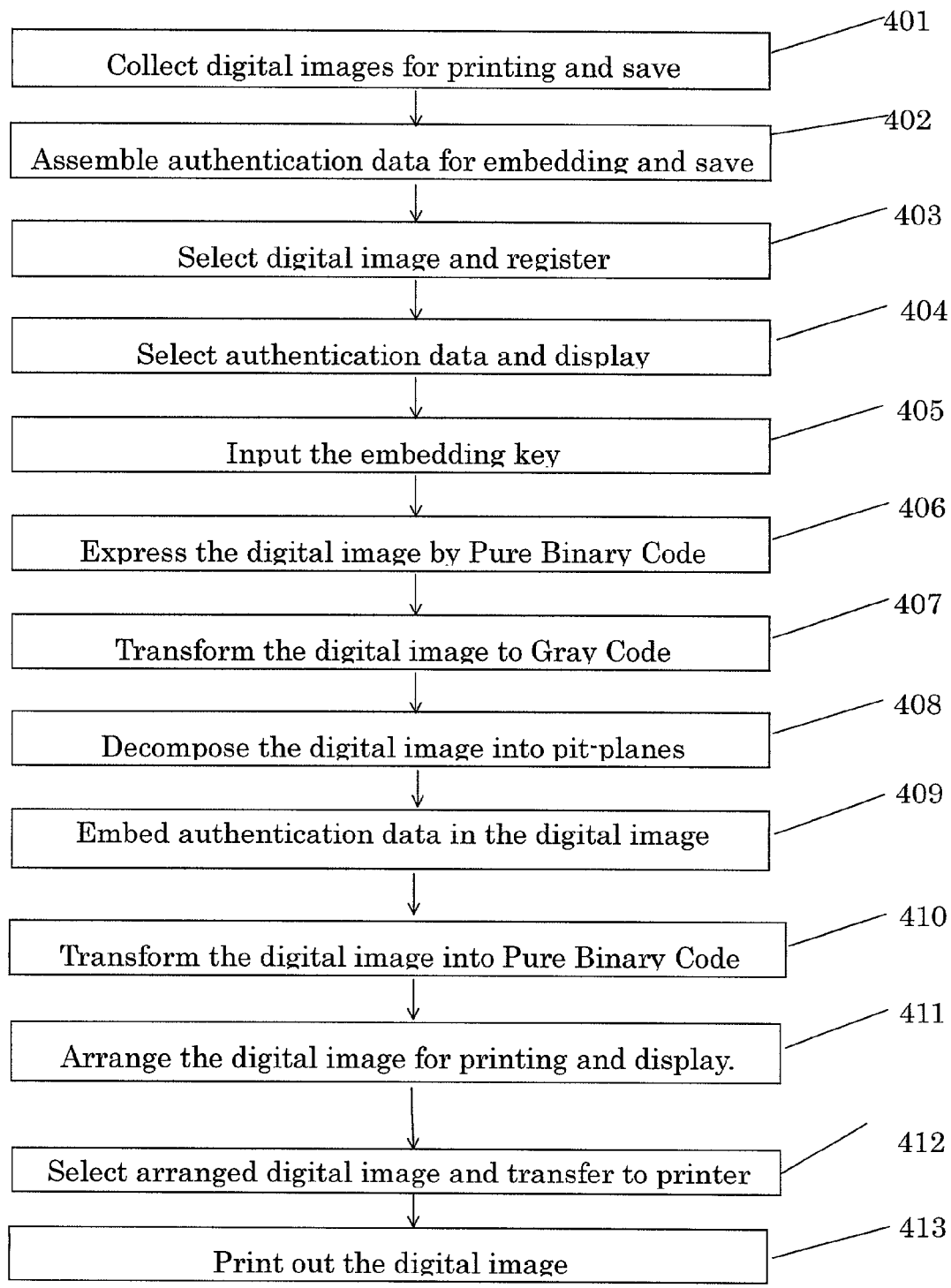
FIG. 4 is a flow chart illustrating the encoding process of the preferred information hiding system using printed matter.

FIG. 4 shows the preferred encoding method performed by the data embedding means 11. The encoding method is preferably carried out by an embedding algorithm, or embedding program, to be executed on the computer 21, and includes the information-data embedding operation as well as the embedding key handling process. This method preferably includes the following steps:

Editing the printing-data that is an N bit digital image, made up of image or pattern data, and saving it temporarily, preferably in a bmp file format 401.

Assembling the information-data for embedding in the digital image and saving it temporarily 402.

Displaying the digital image and the authentication data on the monitor for selection 403.

Selecting the information-data for embedding, and displaying it on the monitor 404.

Inputting an embedding key, which may be a customized key 405.

Fetching the digital image data in terms of the Pure Binary Code (PBC) 406.

Transforming the PBC data into Gray Code (CGC) data 407.

Decomposing the image data in CGC into bit-planes 408. Once this operation is completed, the digital image is transformed to a set of N binary-image planes.

Embeding the information-data into each bit-plane by controlling the detailed embedding method according to the embedding key 409. This embedding is to replace complex local portions on the bit-planes with the information data. If the information data is found to be very simple, then a conjugation operation is applied to the data to make it complex and then afterwards it is embedded.

Composing those embedded N bit-planes into an N bit image in Pure Binary Code 410.

Editing this image to produce a synthetic digital image for printing and displaying it on the monitor 411. A name is assigned to this synthetic digital image and it is saved in the disk storage.

Selecting a synthetic digital image for printing, and sending it to the printer 412.

Printing out this synthetic digital image by the printer 413, which completes the printing process of the printed matter wherein the information-data is hidden.

Figure 5:
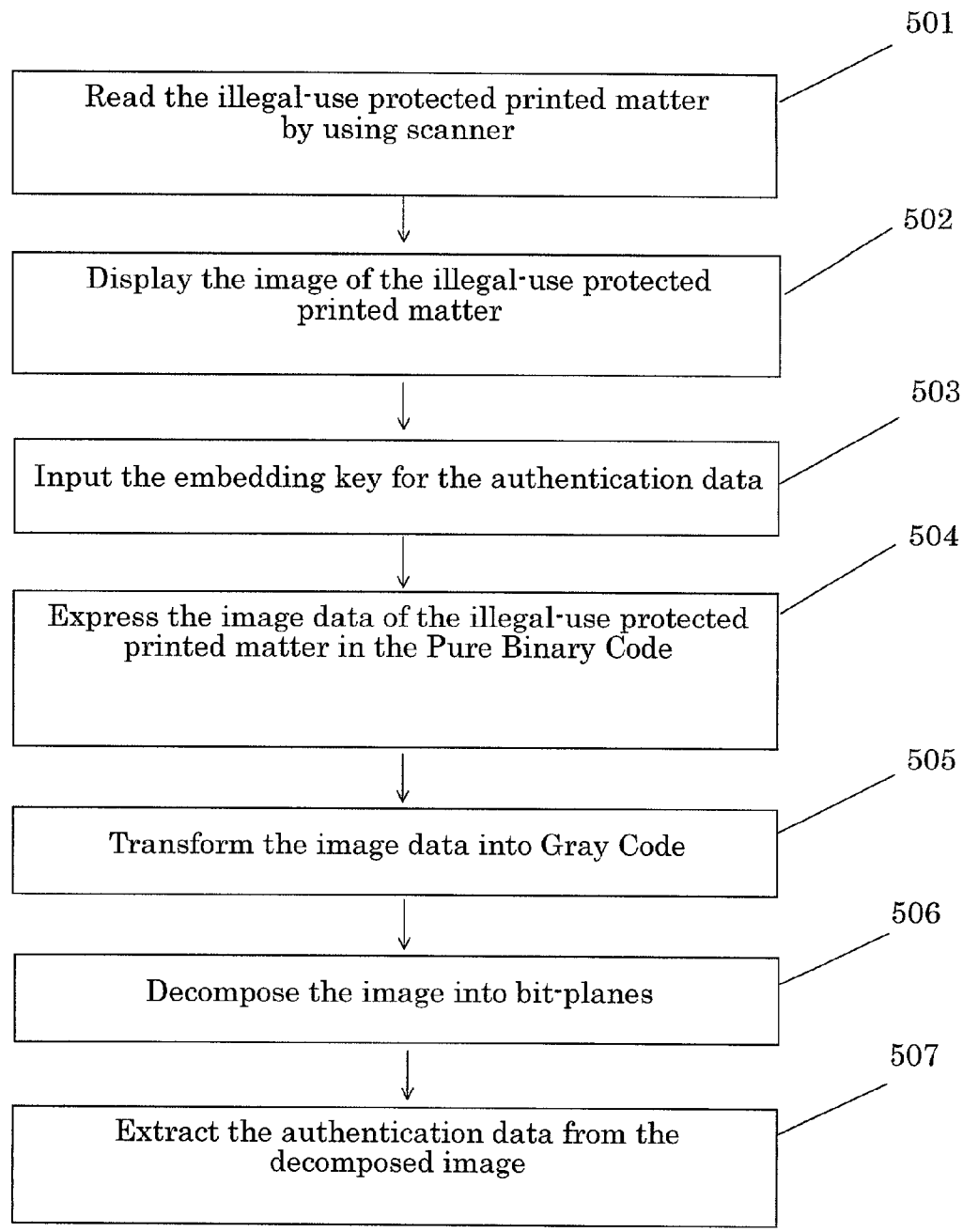
FIG. 5 is a flow chart illustrating the decoding process of the preferred embodiment of the information hiding system using printed matter.

FIG. 5 is a flowchart showing the decoding method used by the preferred decoder for extracting the embedded information-data. As with the encoding method of FIG. 4, this method is preferably carried out by a decoding algorithm, or decoding program, to be executed on the computer 21

Setting the image scanner on the printed matter that is a printout of the printing-data with the information-data (e.g., authentication data) being embedded. The scanner reads the printed matter to get the numerical data 501.

Displaying the numerical data as an image or pattern data on the monitor 502.

Inputting the key, i.e., the numeral data for a customized key, to extract the embedded information 503.

Representing the numeral data of the printed matter that is read by the scanner into the Pure Binary Code 504.

Transforming the PBC data into Gray Code (CGC) 505.

Decomposing the CGC data into a set of N binary images 506.

Extracting the information data out of the decomposed binary image, and displaying the information data on the monitor 507. The preferred extracting operation firstly segments each bit-plane according to the complexity measure for the binary image, then secondly it executes the reverse steps of the embedding to get the embedded information-data (such as the authentication data). In this operation the conjugation map is used to identify the conjugated portion on the bit-planes. The extracted information-data (authentication data) is saved to storage.

In embodiments in which a customized key is used, this customized key must be the same key as the key that was used when the authentication data was embedded. Moreover, the key must be unique to a specific combination of the printer, used for printing, and the scanner to be used, and of the printing-data used in the system (i.e., an image or pattern such as the owner's photo picture or a logo mark used in the said information hiding system). Therefore, the customized key is the data that is only known to someone who operates this information hiding system or someone who is the legitimate user of the printed matter.

The customized key works in the system in such a manner that it provides the information to compensate the scanner output to recover the original image or the pattern before printing as precisely as possible. This scheme makes it possible to extract the embedded information legitimately. Any key that is unauthentic cannot extract the embedded information. No information is extracted out of any copied and forged printed matter. Once the given key leads to an unsuccessful data extraction, it is decided either the key is illegal, or the printed matter is a forgery, or the printed matter has been already damaged more than eligible.

The information about this customized key is not stored or saved in any place in the printed matter. It is data only the system operator or a legal user of the printed matter only have on record, or remembered by heart. Accordingly, there is no chance left for the customized key to be disclosed even if the printed matter is stolen.

The hiding and extracting of information-data according to BPCS-Steganography will be described below in depth. The data to be hidden is referred to as secret data, and the image data in which the secret data is hidden is referred to as a dummy image.

On a bit-plane of a natural image, a noise like area does not appreciably affect the visual appearance to the human eye even if the data therein is replaced with other noise-like data. This characteristic of the human eye allows us to replace noise-like areas in a natural image with secret data. As the criterion to determine an area as a noise-like area may change case-by-case, it is necessary to establish a suitable threshold value according to each dummy image. The following illustrates the embedding process using the BPCS steganographic method.

Let the $2^m \times 2^m$ pixel (e.g., m=3) area be the size of the local area in a binary image. In this case, an area wherein the complexity value satisfies:

$$\alpha_{TH} < \alpha$$

for a given threshold value $\alpha_{TH}$ is judged as an embedding place.

In order to embed a secret data file in a natural image, the secret file must be firstly segmented into a series of $2^m \times 2^m$ file segments (each segment corresponds to $2^m \times 2^m$ pixels on the natural image). Then we embed them in the series of noise-like local areas having $2^m \times 2^m$ size.

However, not all small file segments are guaranteed to have a complexity value greater than $\alpha_{TH}$.

Therefore, a file segment having a smaller complexity must be transformed into a more complex one according to the conjugation operation described below. Once this operation is available, every secret data file can be embedded in any dummy image. In order to secure an exact data recovery of the secret file, conjugation-map data must be kept correctly. Actually, this map information is embedded in some place in the image or the pattern data, i.e., the printed matter.

Now, assume that a white pixel in a binary image (the bit-plane) has a value of 0, while a black pixel has a value of 1. Let P be an arbitrary binary image. The background in this P is defined to be white. W and B in the following explanation designate all white and all black image patterns, respectively. Two checkerboard patterns are described as Wc and Bc. Wc has a white pixel at the left upper corner, and Bc has a black pixel there. (See FIGS. 6-A through 6-F.) P has the B pattern for its foreground, and W for its background. On the basis of this assumption, a "conjugated image" P* of the image P is defined as follows:

$$P^* = P \oplus W_c$$

where $\oplus$ designates an Exclusive-OR operation over pixels.

The operation to get a conjugated image is referred to as the conjugation operation. P* is characterized as follows.
(1) The foreground shape is the same as P.
(2) The foreground area has the Bc pattern.
(3) The background area has the Wc pattern.

P and P* are corresponded one to one. The following relations hold true regarding this P and P*, where "$\alpha(P)$" designates the complexity $\alpha$ of P.
(a) $(P^*)^* = P$
(b) $(P^*) \neq P$
(c) $\alpha(P^*) = 1 - \alpha(P)$ The property (c) is the most important aspect of the conjugation operation among these properties. It says any simple binary image pattern can be transformed to a complex image pattern without losing any shape information, and vice versa, while property (a) insures that the original pattern is always recovered from its conjugated pattern.

The preferred data embedding procedure, according to BPCS-Steganography, takes five steps as is shown below.
(1) Transform a dummy image having the size $2^M \times 2^M$ and the bit-length N bits/pixel into a Gray Coded image
(2) Decompose the Gray Coded image into a set of N binary images.
(3) Segment all the binary images into a sequence of $2^m \times 2^m$ size sub-images. Each sub-image is designated as;

$$P_i : i = 1, 2, \ldots, 4^{M-m}$$

Now the whole area of the n-th bit-plane is denoted by:

$$I_n = \{P_1^n, P_2^n, \ldots, P_4^{M-m^n}\}$$

Similarly, a conjugation map of the N-th bit-plane is described as:

$$C_n = \{Q_1^n, Q_2^n, \ldots, Q_4^{M-m^n}\}$$

where the values $Q_1^n, Q_2^n, \ldots, Q_4^{M-m^n}$ are either "0" or "1". "1" designates the conjugated area, while "0" designates the non-conjugated area.

The data for embedding (described as E) has three parts, the header, the body, and the pad. The header designates the body size. The body is the secret data itself (data used for authentication, for example). The pad is added to the embedding data to adjust its length to a multiple of $2^m \times 2^m$. Let $E_j$ (j=1, 2, ..., J) be a sub-sequence of E having a length of $2^m \times 2^m$. We match one bit to each $E_j$, then we have a $2^{M-m} \times 2^{M-m}$ size binary image. It is denoted as makes($E_j$).
(4) The embedding algorithm is described as follows, where $\alpha_{TH}$ is the complexity threshold.

```
for (n=N,j=1; n -> 1 && j<J; n--) {
    for (i=1;i-<4^M-m && j<J;I++) {
        if(α(P_i^n) -> α_TH) {
            if(α(makes(E_j)) -> α_TH)
                P_i^n=makes(E_j)
            else {
                P_i^n=makes(E_j)*
                Q_i^n="1"
            }
            j++;
        }
    }
}
```

Since lower bit-planes do not contribute much to the image quality, the embedding operation will be firstly executed from the Least Significant Bit. When makes(Ej) is a simple area, i.e., the complexity there is smaller than the threshold value, the conjugation operation is applied to such makes(Ej) area. In this case "1" is set to Qi of the conjugation map.
(5) Restore the Gray Coded N bit image from the data-embedded binary images.

The final secret-data-embedded image is obtained by transforming this Gray Coded image into the Pure Binary Code system.

Extraction of the embedded secret data is possible by taking the reverse steps of the embedding process. The information about the threshold value and the conjugation map is indispensable for it.

In this system the embedded information-data (e.g., personal authentication data) is extracted from the printed image by using a customized key, Thus, in an innocuous printed image, unexpected data such as image, acoustic sound, as well as text data can be hidden concurrently. By checking such hidden data, one who owns the authentic customized key can investigate if the printed matter is original or not, The present invention implemented a method to embed secret information in an image that looks like innocuous printed matter, and also a method to restore it from the said printed matter if necessary. As a result, a secure information transmission can be materialized.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. An information hiding system for hiding information data within printing data disposed upon a printable media, said system comprising:
    embedding means for embedding said information data within said printing data, wherein said embedding means comprises an embedding computer upon which is stored an embedding program means for performing the steps of:
        fetching a digital image represented by pure binary code;
        decomposing said digital image into a set of bit-planes;
        replacing complex local portions of at least one of said bit-planes with said information data;
        composing said bit planes into an embedded image represented by pure binary code; and
        sending said embedded image to said printing means for printing onto said printable media;
    printing means for disposing said information data and said printing data upon said printable media to form a printed matter;
    extracting means for reading said printed matter and extracting said information data from said printing data; and
    outputting means for outputting said information data from said extracting means.

2. The information hiding system as claimed in claim 1, wherein said embedding program means further performs the step of transforming said digital image data from pure binary code data to gray code data.

3. The information hiding system as claimed in claim 2 wherein said embedding program means further performs the step of editing said embedded image prior to said sending step to produce a synthetic digital image for printing.

4. The information hiding system as claimed in claim 3, wherein said embedding program means further performs the step of performing a conjugation operation on said information-data prior to said replacing step.

5. The information hiding system as claimed in claim 1 wherein said extracting means comprises a scanner and an extracting computer comprising a monitor and upon which is stored an extracting program means.

6. The information hiding system as claimed in claim 5 wherein said extracting program performs the steps of:
    scanning said printed matter such that it is converted into numerical data;
    inputting a key into said computer;
    representing said numeral data as pure binary code;
    decomposing said numerical data into a set of binary images;
    extracting said information data from said decomposed binary image; and
    displaying said information data on said monitor.

7. The information hiding system as claimed in claim 6 wherein said extracting program performs the further step of segmenting each of said bit-planes according to a complexity measure for said numerical data.

8. The information hiding system as claimed in claim 7 wherein said extracting program performs the further step of using a conjugation map to identify a conjugated portion of said bit-planes.

9. A method for hiding and extracting information data from printing data disposed upon printed matter comprising the steps of;
    embedding said information data within said printing data, wherein said embedding step comprises the steps of:
        fetching a digital image represented by pure binary code;
        decomposing said digital image into a set of bit-planes;
        replacing complex local portions of at least one of said bit-planes with said information data;
        composing said bit planes into an embedded image represented by pure binary code; and
        sending said embedded image to said printing means for printing onto said printable media;
    disposing said information data and said printing data upon a printable media to form said printed matter;
    reading said printed matter;
    extracting said information data from said printing data; and
    outputting said information data extracted in said extracting step.

10. The method as claimed in claim 9, wherein said embedding step comprises the step of transforming said digital image data from pure binary code data to gray code data.

11. The method as claimed in claim 10, wherein said embedding step comprises the step of editing said embedded image prior to said sending step to produce a synthetic digital image for printing.

12. The method as claimed in claim 11, wherein said embedding step comprises the step of performing a conjugation operation on said information-data prior to said replacing step.

13. The method as claimed in claim 9 wherein said extracting step comprises the steps of:
    scanning said printed matter such that it is converted into numerical data;
    inputting a key into said computer;
    representing said numeral data as pure binary code;
    decomposing said numerical data into a set of binary images;
    extracting said information data from said decomposed binary image; and
    displaying said information data on a monitor.

14. The method as claimed in claim 13 wherein said extracting step further comprises the step of segmenting each of said bit-planes according to a complexity measure for said numerical data.

15. The method as claimed in claim 14 wherein said extracting step further comprises the step of using a conjugation map to identify a conjugated portion of said bit-planes.

16. An information hiding system for hiding information data within printing data disposed upon a printable media, said system comprising:
    embedding means for embedding said information data within said printing data;

printing means for disposing said information data and said printing data upon said printable media to form a printed matter;

extracting means for reading said printed matter and extracting said information data from said printing data; and outputting means for outputting said information data from said extracting means;

wherein said extracting means comprises a scanner and an extracting computer comprising a monitor and upon which is stored an extracting program means for:

scanning said printed matter such that it is converted into numerical data;

inputting a key into said computer;

representing said numeral data as pure binary code;

decomposing said numerical data into a set of binary images;

extracting said information data from at least one of said decomposed binary images; and displaying said information data on said monitor.

17. The information hiding system as claimed in claim 16 wherein said embedding means decomposes a digital image into a set of bit-planes, and wherein said extracting program means performs the further step of segmenting each of said bit-planes according to a complexity measure for said numerical data.

18. The information hiding system as claimed in claim 17 wherein said extracting program performs the further step of using a conjugation map to identify a conjugated portion of said bit-planes.

* * * * *